(12) United States Patent
Frul

(10) Patent No.: US 6,209,847 B1
(45) Date of Patent: Apr. 3, 2001

(54) MECHANICAL LOCKING/ CONSTRAINMENT OF AN ACTIVE LAYER ON A SOLID SUPPORT

(75) Inventor: Viktor Frul, Hudson, NH (US)

(73) Assignee: Brookfield Innovations Inc., Hudson, NH (US)

(*) Notice: Subject to any disclaimer, the term of this patent is extended or adjusted under 35 U.S.C. 154(b) by 0 days.

(21) Appl. No.: 09/150,946

(22) Filed: Sep. 10, 1998

(51) Int. Cl.⁷ .................................................. B29C 33/00
(52) U.S. Cl. .................... 249/80; 249/111; 249/114.1; 264/338; 65/374.11
(58) Field of Search ................. 249/79, 80, 111, 249/114.1, 115, 116; 264/338; 65/374.11

(56) References Cited

U.S. PATENT DOCUMENTS

| | | | |
|---|---|---|---|
| 3,049,769 | * 8/1962 | Schultz | 249/79 |
| 4,004,774 | * 1/1977 | Houston | 249/114.1 |
| 4,327,156 | 4/1982 | Dillon et al. | 428/568 |
| 4,431,449 | 2/1984 | Dillon et al. | 75/246 |
| 4,455,354 | 6/1984 | Dillon et al. | 428/568 |
| 5,207,266 | 5/1993 | Nakashima et al. | 164/348 |
| 5,501,592 | 3/1996 | Kitamura | 425/547 |
| 5,656,051 | 8/1997 | Mares-Benavides | 65/66 |
| 5,855,933 | * 1/1999 | Schmetz | 249/79 |

* cited by examiner

Primary Examiner—James P. Mackey
(74) Attorney, Agent, or Firm—Hayes, Soloway, Hennessey, Grossman & Hage, P.C.

(57) ABSTRACT

The present invention broadly relates to the mechanical locking and constrainment of an active layer on a given solid surface, wherein the active layer is formed. In addition, disclosed herein is a macrostructured mold with improved heat-absorbing ability comprising a solid base and an active layer disposed on the solid base, wherein the active layer comprises a metal matrix composite formed by the process of infiltrating a powdered preform with a molten infiltrating alloy at an infiltrating temperature, wherein the solid base is formed from material with a melt temperature higher than the infiltration temperature. The solid base further contains one or a plurality of preformed grooves for circulation of cooling fluid, wherein the active layer seals the grooves in the solid base wherein the sealed grooves are designed to contain the cooling fluid thereby providing a mold with improved heat-absorbing ability.

22 Claims, 10 Drawing Sheets

MECHANICAL LOCKING/CONSTRAINMENT OF AN ACTIVE LAYER ON A SOLID SUPPORT

FIELD OF THE INVENTION

The present invention broadly relates to the mechanical locking and constrainment of an active layer on a given solid surface, such as a metal surface, wherein the active layer is formed of a metal matrix composite by infiltration of a powder with molten infiltrating alloy. The mechanical locking and constrainment is achieved by modifying an otherwise smooth solid surface to contain selectively positioned regularly defined geometrical features including but not limited to shapes such as rectangular grooves, channels, cylinders, boxes, pyramids and/or triangular types features. Such regularly defined geometrical features, which can be more broadly considered as protrusions or indentations, uniquely contribute to the enhanced locking and constrainment of the active layer as described herein. Accordingly, molds for different production applications, including plastic injection molds, die casting molds, glass forming molds, blow molds etc. can be uniquely prepared according to the present invention and are made to more efficiently lock an active layer on their associated surfaces. In addition, the present invention relates to metal matrix composites, mainly on a carbide base, with sharply improved wear and corrosion resistance, high hardness and mechanical strength. The present invention also discloses multi-layered structures made from different metals or alloys for fabrication of articles with a specific distribution of properties within an article. Finally, the present invention relates to improved mold designs, particularly, the design of a conforming heat-transfer system of molds.

BACKGROUND OF THE INVENTION

Many products required by today's markets are made by molding parts of plastics and other materials. One of the most costly and time-consuming steps in the manufacture of these products is the preparation of molds. A most common mold design generally consists of working inserts of a core and cavity, which contain a working surface with critical requirements of dimensional tolerance and surface finish. Also, inserts contain parting lines and a mold frame, which provides structural integrity to the mold element. In order to prepare molds having an active surface that provides accurate reproduction of the products with every manufacturing cycle, the active mold surface must have a hard detailed finish which in most processes requires complex machining. Such molds must be long lasting so that their cost can be amortized over as large number of manufacturing cycles as possible. All of the problems of mold production are exaggerated when the product has intricate well-defined surfaces to replicate.

In today's world of computer aided design and modeling almost every step in the manufacturing process has been upgraded to accommodate high-speed operations. This presents a real dilemma for toolmakers, as the extended periods required for mold manufacture remains a serious problem. Mold making therefore remains the only low speed operation in the manufacturing process. For example, a typical tooling operation may be optimized to about 14–18 weeks preparation time.

As will be seen, improvements in tooling and surface finish thereof represents one of the purposes of this invention, which is to provide a high-speed method of mold making with a savings in time of about 20 to 30 percent. In addition, mold lifetime is an important factor for many tooling applications, particularly for die-casting or glass forming processes. The present invention is intended to improve significantly such tool life due to the use of new effective tooling materials and new techniques to improve adhesion of the active layer of the mold to the mold substrate surface. Furthermore, in many tooling applications, the function of heat removal is critical as it defines the productivity of the manufacturing process and quality of some cooling-sensitive materials like glass, nylon etc. The present invention, therefore, has the additional object to offer solutions to such issues, which leads to improvement to injection mold heat transfer.

In order to create fine detailed mold elements, and to minimize finish machining, powdered metal casting has become a popular process. The use of powdered metals to make a tools is well established as shown in U.S. Pat. No. 4,327,156; 4,431,449 and 4,455,354. In the methods of the prior art, as disclosed by these patents, a mold or tool element is constructed of a skeleton made of a first metallic powder preform having microscopic interconnected pores filled with a second infiltrating metal. Tool elements of this type are strong, reliable, and can be used to form many complex and detailed shapes. The choice of metal used depends on the application of the tool and can include almost an infinite number of combinations.

A process of manufacturing mold elements is disclosed in the above referenced '354 patent, and is worthy of detailed review. This method consists of constructing a master model of a product to be replicated and forming a mold of rubber or other flexible material therefrom. Appropriate metal powders are mixed together with a heat fugitive thermoplastic binder and then the powder-binder mixture is applied into a rubber mold, and allowed to chill at room temperature. Following low temperature heating of the powdered-binder the preform burns off binder and forms a porous skeleton to be filled with an infiltrating alloy. At a next higher temperature heating, the porous preform is filled with molten infiltrating alloy under capillary forces. At both stages of heating, the powder preform is surrounded and supported with another powder, which does not wet and infiltrate with the molten infiltrating alloy. Therefore an infiltration front stops at a border between wettable and non-wettable powders. Due to very fine particles used in this powder system, a smooth surface with any type of detail can be obtained. Such surface requires a polishing only to be accorded the requirements of a tool.

The above mentioned infiltration method provides the ability to compose materials with different useful properties. For instance, applying carbide powders allows preparation of a high wear resistance tool. The use of corrosion-resistance-infiltrating alloy allows combination of a high wear and corrosion resistance etc. Therefore, the '354 disclosure and related patents completely accord to the requirements of toolmakers from the point of view of surface quality and specific properties of tooling materials. However, these methods do not satisfy a third critical requirement: dimensional accuracy of infiltrated articles. This requirement is so critical that its omission overcomes the above mentioned advantages. The dimensional accuracy problem has therefore stimulated efforts to increase tolerances and dimensional predictability of infiltrated products. Nevertheless, in spite of a number of attempts, there has not yet been achieved a successful result. In fact, a dimensional threshold of acceptable tolerance at +/−0.1% from a total size has yet to be reported.

Because the overcoming of this dimensional threshold is one of the important objects of the present invention, a detailed analysis of sources of inaccuracy, by way of background, is reviewed below.

First, there are several technological steps at the fabrication of infiltrated articles, which are reflected in '354 and similar patents with some variations: making a rubber mold, preparation of a powder preform, burning off a temporary binder and infiltration followed by solidification and cooling. Each link of this technological chain brings its effect on total inaccuracy.

The loss of accuracy starts from a dimensional non-stability of the rubber mold during its fabrication. Then, thermal instability of the rubber mold and non-uniformity of shrinkage of the powder-binder mixture also generates an inaccurate replication of the powdered tool preform. Furthermore, the evacuation of binder by heating the powdered preform in a non-wettable powder medium, according to '354 patent, presents an additional inaccuracy due to shrinkage of the molten binder. An additional loss of accuracy takes place during the infiltration process as the supporting action of an inert powder is not sufficient to prevent possible slumping of the powder preform under its weight. Finally, one further source of inaccuracy according to '354 patent is a non-uniformity of shrinkage of composite material during the solidification of an infiltrating alloy as well as distortions during cooling of the infiltrated article.

A total accumulated error therefore requires the necessity of finish machining of infiltrated articles, which reduces the value of this manufacturing method. Because tool inserts according to '354 patent are made as a solid block with drilled cooling channels, there are no specific solutions offered to improve the heat exchange within an insert. Due to an insufficient accuracy of methods of the '354 and similar patents, such methods have therefore failed to develop any broad applications in the tooling industry in spite of potential usefulness and numerous attempts.

Further to the above, it is noted that at the step of rubber mold fabrication, dimensional errors are caused by shrinkage of the self-curing rubber. That is, as a rule, a silicon rubber, with 0.2% average shrinkage is used for making the rubber molds. After a mold is released from an initial rigid model, it suffers from additional dimensional changes, which are produced by relief and balancing shrinkage stresses within its rubber body. The produced dimensional change is not uniform or predictable due to the complicated shapes and broad variety of possible configurations of tools.

For instance, a mold can comprise local lots with different character of shrinkage progress; in some lots the model may reduce the shrinkage, but in other lots this shrinkage may be free. This situation creates a shrinkage non-uniformity, which is increased by shrinkage stresses after releasing off a model.

In addition, at the step of powder preform fabrication a molded thermoplastic mixture heats the rubber mold, or it may be heated previously to obtain a perfect surface of the powder castings. The heating of rubber is accompanied by a thermal expansion up to 1.5% when heated to 80° C. An irregular configuration of rubber mold therefore generates an irregular expansion for different mold volumes. As a result, the prior configuration of the mold surface can be distorted, especially at lots within rubber walls. Therefore, the direct or non-direct heating of a rubber mold generates an additional source of inaccuracy of a final tool. The following cooling of the powder preform induces shrinkage of both the powder preform and rubber mold. Because the shrinkages are different, stresses cause a distortion of both structures, while the rubber distortion is reversible and the powder preform distorts non-reversibly.

At the step of debinding a powder preform is subjected to stepwise heating with the purpose to burn out the temporary binder. The debinding includes the sequence processes of melting thermoplastic binder, capillary flow into a porous supporting non-wettable powder and vaporization at the final stage of debinding. The melting of binder is accomplished with significant expansion, which is characterized as 14% (vol.) for the most commonly used paraffin-based binders. Therefore, the melting of binder causes expansion of the powder mixture and a powder preform on the whole. The front of binder melting moves within a powder preform with temperatures about even to the melting point of a binder. Such a front of melting crosses a powder preform, creating an alternative expansion of different volumes of the preform.

Expansion of exterior volumes is attenuated by absorption of molten binder into a non-wettable powder, but for internal layers this effect is less significant. The redistribution of molten binder between the powder preform and non-wettable powder causes a piecemeal wane of binder contents from 100% of space between particles of preform to zero at the end of debinding. As binder moves out, it develops compressive capillary forces inside of the preform, as well as making the powder structure more compact along with changing dimensions of the powder body. The maximal value of these forces takes place with a content of binder at 60–70% from its initial content. As it follows, a powder body during debinding is crossed with two waves of dimensional change: the wave of expansion caused by melting of binder and the second wave of contraction caused by the capillary-compression effect of molten binder. Such phenomena produces an additional loss of accuracy in the final tool.

At the step of infiltration physical effects also occur, which are similar to the debinding process, but follow at reverse order. At the first stage of infiltration the spreading of molten alloy at the surface of particles occurs. At this moment the space between particles is not filled completely and powerful capillary-compression forces take place. These forces produce movement, and regrouping, and make the packing of particles tighter. At the second stage of infiltration capillary forces involve additional portions of molten alloy to completely fill the space between the particles. The complete filling turns the three-phase system "liquid—gas (or vacuum)—solid" to a two-phase system "liquid—solid". It also eliminates capillary forces and changes the powder-molten alloy system to the condition of a suspension, which keeps the specific properties of fluids and can flow under its own gravity. The possibility of infiltrated powder to move is forced additionally by increasing the weight of powder preform in comparison to the weight of infiltrating alloy. Because non-wettable powder is not bonded, its supporting function is limited. These circumstances may create a significant modification of preform configuration in the direction of gravity in addition to prior accumulated errors.

According to the teachings of '354 and similar patents, an infiltrating alloy is disposed immediately on the back surface of the powder preform. Such technique entails significant interaction between molten alloy and solid powder. As a result of this interaction an undesirable change of chemical compositions of both components can occur. Because the majority of components have a definite solubility, such interaction could lead to a change in the phase composition of the infiltrating alloy and its temperature of solidification. This can create the phenomena of isothermal solidification of the infiltrating alloy that makes complete infiltration impossible. Therefore the disclosed technique limits significantly the number of possible combinations of powders and infiltrants.

Furthermore, the disclosed solidification of infiltrating alloy and cooling of the composite body generate non-uniform reducing dimensions of a tool due to a gradient of temperature and the specific configuration of the tool. After transition of the composite material to the elastic state, the stresses from deceleration of shrinkage create a distortion of the tool body, which is the final source of dimensional errors noted above.

The '354 patent does not use a thermoplastic binder for forming a powder preform, therefore the thermoplastic binder sources of dimensional errors are not acting directly present therein. However, the problems associated with infiltration with a molten alloy, and the following solidification and cooling are still present. Additionally, the use of a rigid ceramic mandrel causes additional dimensional and surface finish problems. It is a significant dimensional accuracy problem due to the shrinkage during ceramic processing, especially for drying and fairing ceramic articles. Therefore, existing methods of ceramic part fabrication do not allow for preparation high accuracy mandrels pursuant to the teachings of the '354 patent. Also, employing machinable ceramics would be unsuccessful due to a sintering of these ceramics during the infiltration process. Another dimensional inaccuracy source is generated by the interaction between a cooling composite body and ceramic mandrel during a post-infiltration period. Discrepancy between coefficients of thermal expansion (or contraction) of a ceramic and a metal matrix composite material produces stresses within each material. Most common are compression stresses at the ceramic body and tensile stresses at the composite body, but there are also exceptions, which depend on the configuration of the ceramic mandrel and composite body. Therefore the positive supporting function of the ceramic mandrel is not valid for all volumes of a composite body. As it follows, some volumes of a tool body suffer a reduced shrinkage, but some volumes have a free shrinkage. Consequently, the '354 disclosure is not suitable as a high accuracy technique. Furthermore, the potential for cracking is also a disadvantage of the '354 disclosure because the rigid ceramic mandrel generates shrinkage stresses of the composite body. If stress therefore concentrates in definite local zones and exceeds the limit of strength, cracking is caused especially for extended zones of shrinkage deceleration.

Another disadvantage of the '354 and similar art is the tendency to fabricate a whole tool body of the same composite material, i.e. expensive powder materials and infiltrating alloys. But the specific properties of metal matrix composites for tooling applications are only needed for the tool working surfaces. It is desirable, therefore, that the tool base be made from a low cost material with high strength and without special properties like high hardness, corrosion resistance etc. These properties are useful from the point of view of stresses absorbing during the production cycle, easy machining, cost reduction, etc. Fabrication of a tool as a piece from a single metal matrix composite is not desirable, as infiltration of a large powder mass leads to increasing inaccuracy, as this process is sensitive to a scale factor. Another disadvantage of the '354 and similar patents is the low efficiency of their cooling systems.

The heat-removing function is the second main function of the injection mold, together, of course, with the shape-forming function. Therefore the need to improve heat-removal has stimulated high patent activity in the area of mold cooling. U.S. Pat. No. 5,501,592 and U.S. Pat. No. 5,656,051 disclose different designs for cooling channels with the common idea to redistribute the cooling action at all active surfaces of the mold. U.S. Pat. No. 5,207,266 offers technical solutions based on using inserts made of copper or other materials with high thermal conductivity. Nevertheless, for significant improvement of cooling ability in a mold, the teachings of '592, '051 and '266 are insufficient due to limited possibilities of disposition of the cooling channels by the conventional machining methods.

An effective solution is offered in U.S. Pat. No. 4,637,451 wherein a system of channels was replaced with a cooling chamber inside of a mold. An active surface of a mold is made as a shell with thickness of about 6–10 mm, while the internal surface of a shell is contacted with a fluid-cooling agent. The heat removing ability of this mold is extremely high due to an extensive surface of heat exchange and reduced heat resistance of the thin wall-shell. However, this design reduces the structural strength of the tool and limits the possible fields of application of this tool. Besides, the circulation of fluid cooling within the tool is not regulated and therefore the mentioned tool design does not allow one to realize a selective heat transfer, and there is a probability of over-cooling of the mold.

As it follows from the above review, the prior art has concentrated on solving separate and tedious tooling problems like cost and time reduction, increasing tool life, heat transfer improvement etc. But since all tooling problems are interrelated, solving a separate problem usually generates another problem. For example, improving tool life by employing a hard alloy creates multiple problems of machining, high cost and low constructive strength of a tool etc. That being the case, a comprehensive solution of all tooling problems remains necessary and represents yet another important goal of this invention as set out below.

SUMMARY OF THE INVENTION

A solid surface with enhanced mechanical locking interaction to an active surface layer comprising a solid base substrate with a surface thereof and an active layer disposed on said solid base surface, wherein the surface of the solid base comprises selectively defined and positioned geometrical shaped features, the active layer comprising a metal matrix composite formed by infiltration of a powder with molten infiltrating alloy. The geometrical shaped features on said solid base surface in contact with said active layer comprises protrusions or indentations on said solid base substrate. The protrusions or indentations comprise cylindrical shapes, a square box shapes, triangle shapes, round shapes, multi-sided polygonal shapes, and mixtures thereof.

A macrostructured mold with enhanced mechanical locking interaction to an active surface layer comprising a solid base with a surface thereof and an active layer disposed on said solid base surface, wherein the surface of the solid base comprises a non-smooth and textured surface, the active layer comprising a metal matrix composite formed by infiltration of a powder with molten infiltrating alloy. Preferably, the textured surface comprises protrusions or indentations on said solid base substrate.

The present invention also relates to a macrostructured mold with improved heat-absorbing ability comprising a solid base and an active layer disposed on said solid base, said active layer comprising a metal matrix composite formed by the process of infiltrating a powdered preform with a molten infiltrating alloy at an infiltrating temperature, wherein said solid base is formed from material with a melt temperature higher then said infiltration temperature, said solid base further containing one or a plurality of preformed grooves for circulation of cooling fluid, wherein said active layer seals said grooves in said solid base wherein said sealed grooves containing said cooling fluid provides said improved heat-absorbing ability.

The present invention also relates to the preparation of mold inserts having a minimum amount of expensive materials and apply new effective but expensive materials without significant increase in cost of molds. A second objective is a sharp enhancement of cooling abilities of molds, with the purpose of reducing molding cycle time, and improving the quality of molded products. A third objective of this invention is to reduce mold production time, offset the inaccuracy caused by shrinkage, and eliminate or sharply cut the additional machining of inserts after infiltration.

The mentioned objects are attained in the present invention by practicing the method of bimetal mold design, which includes the sequential steps of fabrication of a solid base of the tool with reduced sizes, and applying a metal matrix composite layer having a final configuration and dimensions of the tool. At the first stage the tool solid base is preferably made from steel, cast iron or other relatively high-melting alloy with appropriate properties. The solid base is made by casting or machining and contains cooling channels and other elements of the mold design. Dimensions of the solid base are preferably reduced on the front side and increased on the other sides. The weight of a solid base preferably forms 70–95% of the total mold weight, and the remaining weight comprises a composite material layer obtained by infiltration. The solid base is preferably used for applying and supporting of a powdered active layer. The face side of the solid base is covered with a regular system of mechanical engagement, the noted protrusions and indentations, which supports the powder layer before infiltration and a metal matrix composite layer after infiltration. The face engagement decelerates shrinkage and provides a uniform distribution of stresses without concentration of stresses in local zones, accordingly cracking or the probability of cracking is reduced.

According to the present invention, the heat transfer within a mold is radically improved by creation of a system of substantially uniformly sprayed channels, which forms the cooling jacket and covers all working surfaces of a mold. Channels locate equidistantly to the active surface with a given distance, therefore the heat transfer is significantly more effective compared to known mold designs. The conforming cooling system can be developed for any configuration of an active surface. Additionally, separate lots of working surface of a mold are made with implantation of thermal-insulating inserts for reducing heat-transfer. Such dividing of working surfaces at active and passive heat-transfer zones allows for the design and fabrication of molds taking into account the recommendations of thermal modeling. The practical value of the mentioned advantages are simultaneity and uniformity of cooling of molded products, which is a necessary condition for production of high tolerance moldings without distortion. In addition, the invention herein provides a sharp reduction in the molding cycle and improvement of productivity.

Definitions

As used in the present specification and the appended claims, the terms below are defined as follows:

"Active layer" of a mold, as used herein, means a face part of a mold having form of thin shell. Active layer directly contacts with a molded material and transfers heat from its working surface to a cooling agent. The face side of active layer strictly corresponds to a needed configuration and dimensions of a final mold while the opposite side repeats configuration and dimensions of solid base of a mold. Active layer made of a metal matrix composite by infiltration of a powder with molten infiltration alloy and bonded mechanical and metallurgical to the solid base of mold.

"Face side of solid base" as used herein, means the side that contacts to the active layer of the mold and approximately repeats the configuration of a mold.

"Infiltrating alloy" as used herein, means an alloy, which wets a material of the solid base and a powder of the active layer. By this wetting a molten infiltrating alloy produces capillary forces which are enough to overcome a hydraulic resistance during infiltration. The melt temperature of infiltrating alloy is at least 100 deg. C lower then the same for material of the solid base and powdered filler of the metal matrix composite.

"Laminated solid base", as used herein, means a solid base made from individually designed shaped steel laminas. Being assembled at a pre-infiltration state, laminas form a laminated solid base comprising elements of the cooling system, mechanical bonding and fastening. At post-infiltration state a laminated solid base is a monolithic block due to metallurgical bonding laminas.

"Macrostructured mold" as used herein, means a mold, which consists of structurally different zones made form materials with different properties. The typical structural zones in the present invention are active layers of metal matrix composite, solid base of steel and thermal-insulating inserts of a ceramic.

"Metal matrix composite", as used herein, means a material made by infiltration which is characterized with heterogeneous structure comprising at least two phases with different melting temperatures (filler and binder).

"Metal binder", as used herein, means a metallic three-dimensionally oriented phase of metal matrix composite bearing a uniting function for a filler of metal matrix composite. An infiltrating alloy serves as the binder of metal matrix composite after completing infiltration.

"Metallurgical bonding" of an active layer to a solid base, as used herein, means a non-disconnected bonding caused by interaction of molten infiltrating alloy with metal of the solid base. Such bonding is similar to bonding of soldering processes and includes multiple processes of chemical interaction, dissolution, creating intermediate alloys etc.

"Monolithic solid base", as used herein, means a solid base of a mold made as whole block by casting or machining.

"Powdered active layer" of a mold, as used herein, means a preform of active layer made of a thermoplastic mixture of a powder, which is the filler in a metal matrix composite. Configuration of powdered active layer corresponds to active layer while its dimensions are corrected with account of shrinkage metal matrix composite during infiltration and solidification.

"Powder filler", as used herein, means a powder, granules or shot of metals, alloys, carbides, borides or their mixtures, which are uniformly distributed and cemented within and by a binder or matrix of composite material and form specific properties of this material.

"Solid base" or "Solid base of a mold", as used herein, means a separate monolithic or laminated metal body of a mold which have reduced dimensions of its face side and increased dimensions of other sides relative to dimensions of a final mold. Solid base is made of an alloy with higher melting points than a temperature of infiltration.

"Thermal-insulating inserts" as used herein, means inserts, which are disposed between the solid base and active layer of the mold and are made from non-wettable powder with low thermal conductivity.

"Wettable powder" as used herein, means a refractory powder, which can be wetted and infiltrated by a molten infiltrating alloy under capillary forces without additional pressure. Wettable powder does not sinter with an infiltrating temperature. Powders of iron, steels, nickel and nickel alloys, and carbides, are examples of wettable powders.

"Non-wettable powder" as used herein, means a refractory powder, which cannot be wetted and infiltrated without additional pressure. Non-wettable powder does not sinter with an infiltration temperature. Oxides of silica, aluminum or graphite are examples of non-wettable powders.

"Working surface" of a mold, as used herein, means the surface of the active layer, which immediately interacts with a molded material.

BRIEF DESCRIPTION OF THE DRAWINGS

The preferred embodiment of the invention is described in more detail below with reference to the attached drawing of this invention.

DETAILED DESCRIPTION OF THE INVENTION

Figure 1:
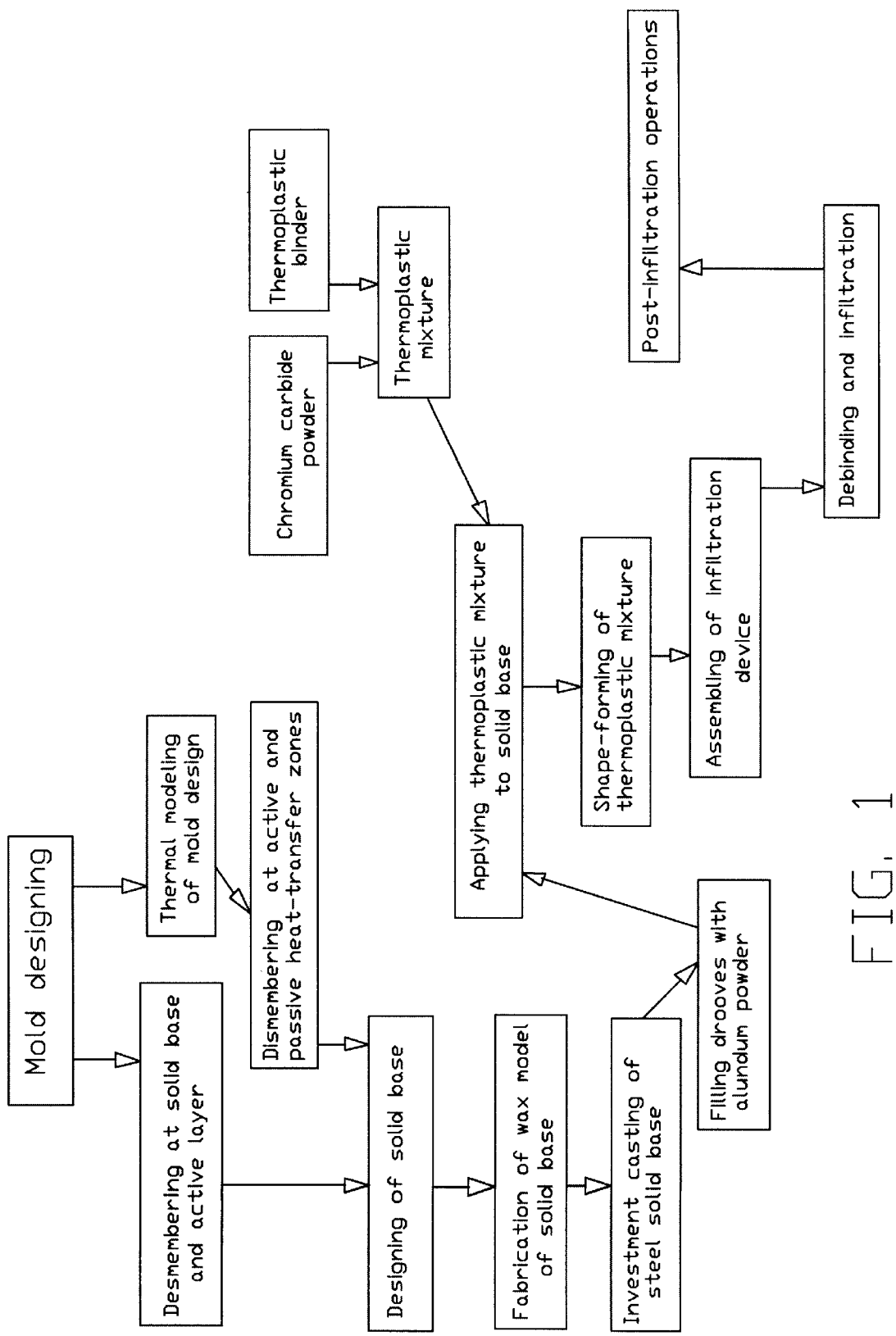
FIG. 1 is a schematic view of the technological sequence of the present invention.

In preferred embodiment, the present invention provides a macrostructured mold with a conforming cooling system. The mold incorporates a solid base and thin active layer, which are metallurgical and mechanically bonded to create a monolithic mold body. A cooling system is disposed between the solid base and active layer and executed as a system of cooling channels which is sprayed on all working surfaces of the mold and repeat the configuration of mold. The solid base is fabricated from a relative high melting alloy, preferably from carbon steel. The face surface of the solid base is textured with a net of grooves, which form a cooling system in the final mold. Selected lots of the face side are covered with isolated lots for disposition of thermal-insulating inserts. All face surfaces of the solid base are topped with substantially uniformly distributed protuberances and selected areas of the face are partially filled with thermal insulating material.

The present invention also provides a method of fabrication of a macrostructured mold, which includes consequent engineering of a mold design and dismembering it at a solid base and an active layer. The mold design is dismembered at active and passive heat-transfer zones using thermal modeling mold design data. After it a textured surface of the solid base is designed with a net of grooves, isolated cells and protuberances. Then a solid base with reduced dimensions relative to final dimensions of a tool is fabricated. Grooves are filled with a non-wettable powder and then the face side of the solid base is covered with a shaped layer of a wettable powder.

Following heating of the assembly that consists of a solid base and a powdered active layer, an infiltrating alloy causes melting and infiltration of the powdered layer. Infiltration transforms the powdered layer to a shaped metal matrix composite layer and simultaneously bonds the metallurgical solid base and active layer into a monolithic macrostructured mold. The cooling system of mold is formed after infiltration by removing inert powder from the closed grooves. Such cooling channels have a quadrangle cross-section in which three sides are formed with grooves of the solid base, and one side is formed with composite layer. The solid base is used as a rigid support for the active powder during the steps of applying the powdered layer, or when shape-forming the active layer, or when burning off of the temporary thermoplastic binder, or during infiltration, or during solidification and cooling of the infiltrated active layer.

The first advantage of the present invention is a sharp consumption of expensive components of composite materials due to the use of an inexpensive solid base of a mold, which accounts for 80–95% of mold volume. The consumption of active powders and infiltrating alloys is therefore reduced at 8–9 times over prior art designs. Employing expensive but effective materials for fabrication of molds becomes possible without consideration of material cost. This point is especially significant for fabrication of large molds, where the material cost was a limiting element due to its practice of manufacturing the entire mold from a composite material.

Additionally, the molds herein allow for the combination of materials with different properties, even opposite properties or difficult compatible properties within a mold. For example, the methods of the present invention allow mold fabrication with a hard and wear resistant active surface and tough base. This is an ideal combination of properties for the majority of tools that can not be obtained by known prior art techniques.

The present invention also divides the mold at two functional zones, as well as allowing sequence fabrication, and the use of independent materials. Therefore, the present invention eliminates the prior art necessity of searching for a single material, which must combine properties for preparation of an active surface and at the same time must provide reliable constructive strength.

The other advantages of the present invention are the positive role of a solid base at that section of the mold requiring dimensional accuracy. That is, there are several advantages to such improved dimensional accuracy using the solid base design of the present invention. The first benefit is the sharp reduction in volume of powder mass for production of a mold. Contrary to the common practice of prior art, only a part of the mold of the present invention is made from a metal matrix composite.

As dimensional accuracy is sensitive to a scale factor, reducing the thickness of the powder preform also serves to decrease dimensional error at all steps of mold fabrication pursuant to the present invention. Furthermore, the solid base can comprise a monolithic or fastened laminated massive body, which does not suffer significant change to its dimensions at infiltration temperatures or upon cooling. It is believed that due to relatively large structure and approximately symmetric configuration, the solid base of the present invention does not distort during heating operations. That is, a thermal expansion of the solid base during heat-up is compensated with a thermal contraction during cooling. Therefore the mentioned heating-cooling cycle does not produce a significant dimensional change of dimensions.

The supporting function of a solid base also is based upon the fact that the material of the solid base (mainly steel) has a higher melt temperature and higher high-temperature strength than the composite material of active layer made by infiltration. The solid base of the present invention therefore provides a stabilizing "solid base—active layer" structure. The solid base absorbs and resists stresses, which are generated into the active layer by thermal changes and phase transitions.

The supporting function of solid base starts with the application of the thermoplastic powder mixture. The textured surface of solid base resists shrinkage of the solidifying mixture. Then solid base prevents substantial movement of the powder structure during burning off of the temporary binder. Burning off of binder therefore proceeds faster and smoother than in prior art techniques since a thin powder layer has much better efficiency for removing vaporized binder than those massive and thick powder bodies previously disclosed.

There is also a positive role for the non-wettable powders, which are disposed into the cooling grooves and isolated cells. Again, the heat transfer of molten binder and vapor proceeds in two directions: external and internal. Because the metal solid base has a high thermal conductivity and small internal temperature gradient, the temperature range for burning is now regulated more precisely.

During heating to an infiltrating temperature, the solid base of the mold prevents shrinkage and distortion of the powder layer due to thermal expansion. Furthermore, due to mechanical bonding with textured surface of solid base, the powdered active layer is limited to the expansion of solid base. Most significantly the supporting function of solid base is indicated during infiltration.

The rigid solid base herein supports the thin layer of infiltrated powder and accepts any movement of the active layer. Following cooling, solidification of the infiltrating alloy occurs along with thermal contraction of both the solid base and formed composite layer. Shrinkage from solidification is felt by the textured surface of solid base. At this moment the composite layer exists in a solid-fluid state and does not have the ability of plastic deformation around the elements of the textured surface. These circumstances can therefore produce micro-cracks in the composite layer. However, these cracks are filled with molten infiltrating alloy under capillary forces, therefore fault defects are herein avoided.

After solidification and cooling, the composite material in the active layer assumes the condition of plastic deformation. This condition in the composite layer is followed by contraction of the solid base without creation of stresses. The situation is changed when the composite material transfers to the elastic state. Any discrepancy between coefficients of thermal expansion of the solid base and composite layer creates stresses at both components. These stresses can produce cracks in the composite layer as the less strong component. According to the present invention, distribution of stresses around protuberances/indentation of the textured surface substantially eliminates such cracking possibility.

The protuberances/indentations actually create a system of stressed fields that do not allow concentration stresses above a critical value, which would otherwise be sufficient to collapse or distort the composite layer. The textured surface dilutess stresses and it is believed that the composite layer, to the extent that it experiences dimensional changes transmitted from the solid base, now uniquely remains without cracking and distortions. The above mentioned particularities of interaction of the solid base and the composite layer of the present invention cause sharp improvement of dimensional accuracy of fabricated molds accordingly to the present invention. In fact, the control measurements of these molds have shown that deviation of dimensions falls in the range +/−0.02% in the size range from 50 mm to 160 mm. This approach is therefore acceptable for fabrication a number of molds without final machining and permits sharp reductions in the machining of mold requiring highest dimensional requirements. Accordingly, the invention herein employing the macrostructured mold concept on a solid base eliminates sources of errors that have been reported in the prior art. Furthermore, the surface finish of products made with the present invention is also improved due to the improved conditions for burning off the temporary binder.

Another group of advantages of the present invention relates to the intense improvement of heat removal in molds. There are two factors that improve such heat removal: the ability herein to selectively dispose cooling elements as well as the selective disposition of thermal insulating elements at different local zones of a mold. Together these factors allow for the desirable positioning of heat transfer features at different zones of a mold. Depending upon the particular features of molded products, the active surface of mold herein is divided at active heat-transfer and passive heat-transfer zones. The first zone is characterized with disposition of cooling channels. The second zone is characterized with disposition of thermal-insulating elements.

The selective disposition of cooling elements in the active zone comprises controlling the size of the cooling channels, as well as cross-spacing the ratio of cooling channels, as well as controlling the distance between cooling channels and active surface of a mold. The selective disposition of thermal insulation elements in the passive zone similarly comprises controlling location, size, and the cross-spacing ratio of insulating elements in the mold body as well as the distance from the insulating elements to the active surface and/or cooling channels. Combining cooling and insulated local zones within the mold therefore allows one to install an overall desirable thermal heat-transfer profile for the mold. The practical effect of this is reduction in production cycle times, an increased quality of molded products and much better conditions for molding difficult-to-mold materials.

Another advantage of the present invention is the observed sharp improvement in mold life due to the use of a metal matrix composite with extremely high wear and corrosion resistance. Because such materials are made as a combination of 60–65% (volume) of powder component or as a mixture of different powders and 40–35% of metallic binder, there are almost unlimited possibilities for producing desirable microstructures and alteration of properties of materials depending on tooling applications. The particular composite material, which is made e.g. by infiltration of a preferred powdered chromium carbide preform with a copper-based alloy, is found useful for fabrication of plastic injection molds. This material comprises high corrosion and wear resistance, high thermal conductivity, good polishing ability and the coefficient of thermal expansion that is close to the same for steel. Another preferred composite material is that made by infiltration of tungsten carbide powder preforms with cobalt- or iron-based alloys, which have been found useful for making die casting molds or glass forming molds. Tungsten carbide based materials combine extremely high hardness, wear resistance, fatigue resistance and structural contacting stability with molten aluminum, zinc or glass. Accordingly, the present invention is not limited by the above mentioned preferred composite materials and those preferred materials for fabrication of the solid base.

Another advantage of the present invention is improvement to the infiltration technique by separating a powder preform and infiltrating alloy. In the present invention, the powder preform of the mold and a charge of infiltrating alloy are disposed separately with a definite distance and connected locally through powder connectors. This approach allows reduction in the interaction between the molten infiltrating alloy and powder as the contacting surface is sharply diminished. The practical effect of this preferred procedure is to avoid isothermal solidification of the infiltrating alloy due to creation of new metallic phases, with melting temperatures higher than the temperature of infiltration. The consequence of this is a widening of the number of possible combinations of powders and infiltrating alloys. Additionally, employing powder connectors make it easier to set apart the infiltrating remains alloy from infiltrated articles. Using powder connectors also eliminates an eroding of the infiltrated mold as well as a necessity of machining the remains of infiltrated alloy. It also allows placement of connectors at any place in the mold, and even at its face side, without significant efforts for removal of the connectors after infiltration.

Another advantage of the present invention is reduction in the cost of molds. This reduction is the result of the already mentioned reduced consumption of powders and infiltrating alloys. The second aspect of cost reduction is the method herein of shape forming a powdered active layer. According to the present invention, CNC-machining a soft and easy-machined powder mixture with a thermoplastic binder is employed for forming a given mold shape. Such machining herein is much faster and less expensive than machining steel or even aluminum alloys. Additionally, cost reduction is achieved since it is relatively inexpensive to fabricate the above-mentioned solid base. That is, high tolerance and surface finish of the solid base are no longer required, and according to the present invention, it can be achieved with an inexpensive method of casting or rough machining.

Another advantage of the present invention is rapid manufacturing molds and near perfect compatibility with computer guided methods for designing, rapid prototyping and machining. That is, the macrostructured mold and method of the present invention provides rapid fabrication of short run molds. At the same time, the macrostructured mold of the present invention also provides permanent molds and long service life. Therefore the same macrostructured mold produced herein can be used for two applications: as a short run mold for pilot plant production and at least as a temporary mold for mass production. These features reduce significantly the time and cost of producing new plastic, metal or glass articles.

The typical time for manufacturing molds according to the present invention is 12–17 days (TABLE 1), which confirms that the present invention allows for rapid tooling production.

TABLE 1

| Design of solid base | Preparing a solid base, Days | Applying and shape forming a powder layer, days | Assembling, Burning off binder, infiltration, days | Finish Operations, days | Total time, Days |
|---|---|---|---|---|---|
| Monolithic (investment casting) | 7 | 3 | 2 | 5 | 17 |
| Laminated (laser cutting) | 2 | 3 | 2 | 5 | 12 |

All together, the new macrostructured mold design, the new composite materials and new methods of mold manufacturing create a new integral interconnected technological improvement in the tooling area, which exceeds the designs of the prior art.

Further discussion of a macrostructured mold and the method according to the present invention is continued below with examples of the preferred embodiments. Referring to the drawings, the macrostructured plastic injection mold and method of fabrication of such mold is shown in FIGS. 1–8. Initially it is necessary to construct a general design of a mold using traditional methods of designing in the form of a CAD-file (see the operation chart, FIG. 1).

A general design of a core and a cavity of a mold include all geometrical and numerical data needed for building the mold. In particular, overall dimensions of mold inserts, configuration and dimensions of working surface of the core and cavity, with consideration of shrinkage of the molded material, location of ejection-pins and inlets, consideration of the mass and temperatures of molded material, temperatures of ejected moldings etc. are defined. Then thermal modeling of the mold design is executed by dividing the active surface of the mold into heat-transfer zones i.e. active and passive zones as discussed above. Active heat-transfer zone design is supplied with an optimal disposition of cooling channels, i.e. the distance between the working surface of the mold can be varied as well as the number, form and cross-sectional dimensions of the cooling channels. In addition, grouping of channels can be made to provide for different cooling intensity for different areas (if needed). The passive heat-transfer zone design is also supplied with different dimensions for the thermal-insulating inserts.

Figure 2:
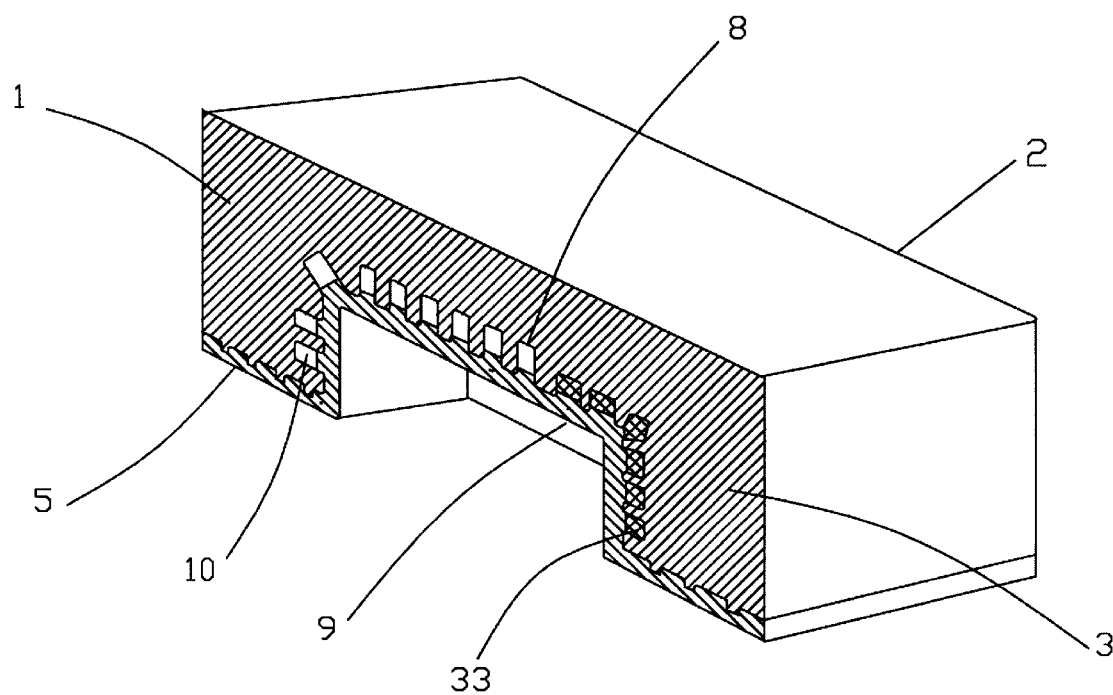
FIG. 2 is a schematic sectional view of an injection mold of this invention.

FIG. 2 illustrates the macrostructured mold (cavity) 2 containing a solid base 3 an active composite layer 5. The thickness of the composite layer in the preferred embodiment is about 3.5 mm, therefore the configuration of the face side of the solid base is defined by subtraction of the volume of a 3.5-mm active layer from a general design of the core and cavity. The thickness of the solid base 3 is therefore reduced at 3.5 mm while other overall dimensions are increased at values that are even to specified allowances for machining at a final stage of mold fabrication. All dimensions are specified taking into consideration the shrinkage of the solid base during its casting.

Figure 3:
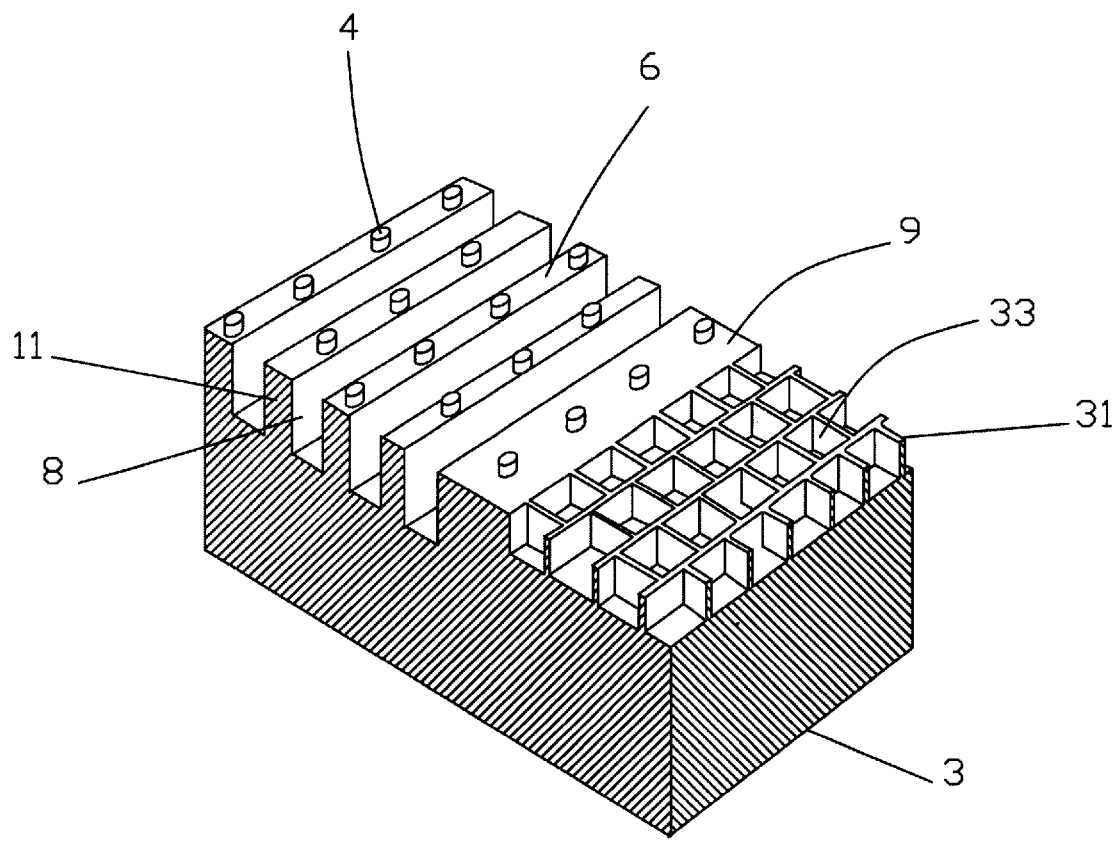
FIG. 3 is a fragmental schematic section of a solid base with elements of a textured surface, cellular surface and grooves.
Figure 4:
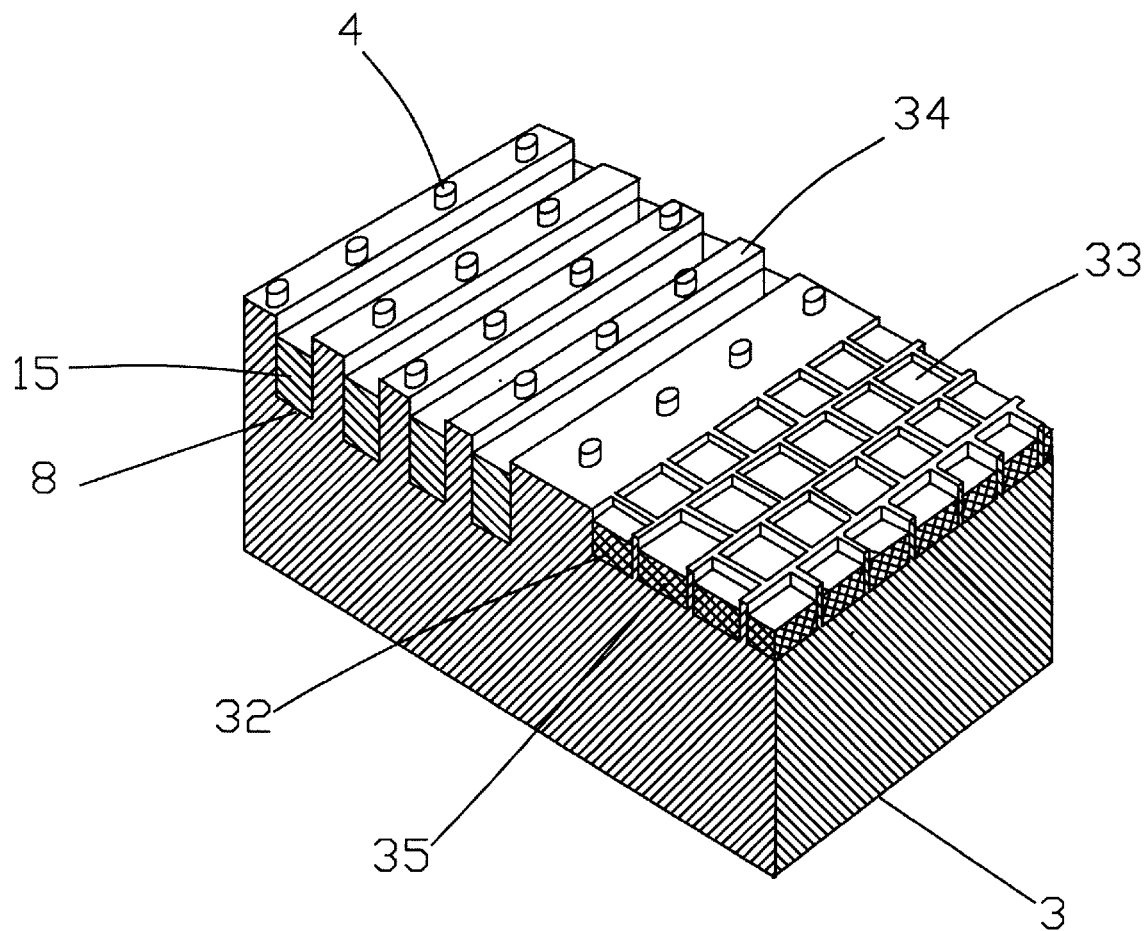
FIG. 4 is a fragmental schematic section of a solid base with filled grooves and cells.

Additionally, the net of grooves 8 is designed according to data supplied from thermal modeling (FIGS. 2 and 3). Grooves 8 are created with the purpose of forming a cooling system 7 in the final mold (FIG. 2). The cooling system 7 is formed after metallurgical bonding of the active layer 5 of the composite material to the face surface 9 of the solid bases of core and cavity 3. Such, cooling channels 10 are formed within three sides of grooves 8 and the active composite layer 5. The depth of grooves is specified such that active composite layer 5 is introduced into the grooves 8 at preferably 2 mm for reliable sealing of the cooling channels 10 (FIGS. 3 and 4). Grooves 8 are connected with the inlet 13 and outlet 14 for cooling fluid. The design of the grooves for the core of the mold is preferably made taking into consideration the disposition of injector-pins. The grooves therefore create an active heat-transfer zone in the mold characterized by increased and efficient heat-absorbing ability.

The design of the solid base in the present invention also includes disposition of a passive heat-transfer zone with a low thermal-absorption ability, i.e., low thermal conductance and capacitance. This zone is preferably disposed around the inlet of injected plastic material. The reduced heat transfer in the inlet area thereby promotes easier filling around the inlet of injected plastic material. Furthermore, the passive heat-transfer zone can be positioned at areas in the mold forming thin walls or ribs. Preferably, the passive heat-transfer zone solid base is engineered with a cellular surface 31 which contains cells 33 for disposing thermal insulating inserts 32 (FIGS. 3 and 4). In the preferred embodiment the wall thickness of cells 33 was selected at about 3 mm with cells sizes of about 5 by 7 mm and 7 mm depth.

Furthermore, the structure of the textured surface 6 of the solid base is preferably designed with protuberances 4 covering the face surface 9 of solid base 3 (FIG. 3). The textured surface 6 is created for the purpose of dividing the face surface 9 into what can be described as separate islands for mechanical support and constrainment or interlocking of active layer 5 and deceleration of shrinkage during solidifying and cooling of the infiltrated active layer. In the preferred embodiment the protuberances 4 are 2-mm high and 5-mm in diameter and are spaced with a distance between them on center of about 12 mm. The grooves 8 in the preferred embodiment are about 7 mm deep and 4 mm wide with a distance between neighbor grooves of 5 mm.

As noted, these dimensions provide a non-destructive thermal-mechanical interaction between the low-carbon steel of solid base and chromium carbide composite material of the active layer. However, the dimensional tolerances of grooves 8, textured surface 6 and the cellular surface 31 can be different depending upon the thermal-mechanical properties of other materials selected for the solid base and the active layer. Accordingly, the preferred criteria for specifying placement and dimensions of the protuberances 4 is that a thermal-mechanical stress created by the protuberances would not exceed a limiting ability of the composite material to be deformed without cracking. The preferred criteria for specifying placement and dimensions of the grooves 8 and cellular surface 31 are that a desirable cooling intensity will be obtained, and constructive strength will be provided.

The solid base 3 of the core and cavity are fabricated using the investment casting process. Wax models of the solid base can be made several ways, but a preferred method is to employ the jet-printing rapid prototyping system "Actua" from 3D System Company (CA). The prior created CAD-file of the solid bases of a core and cavity is used for wax printing (FIG. 1). After wax models are prepared, the standard procedure of investment casting technology are applied, such as building up of a ceramic shell, melting off of wax, firing of ceramic shells and pouring up molten low-carbon steel. It is clear that other alloys with relative high melting points, such as cast iron, carbon or alloyed steels can be used in the practice of the present invention as a material for the solid base. Castings of the solid base are then cleaned and backsides of the solid base are preferably machined in order to obtain a generally flat surface for further operations.

The opened grooves 8 in the active heat-transfer zone 28 are partially filled with a mixture 15 of about 50 micron alundum powder (DYNABLAST from Norton Company, MA) and a sicative glue (FIG. 4). Such filling prevents filling up of the channels by the infiltrating alloy during the infiltration step. A 5% solution of (Piloform BN 18 from Wacker Chemicals U.S.A, Inc., Norwalk, Conn.) in ethyl alcohol was used as the sicative glue. The glue-aluminum oxide powder mixture 15 is allowed to dry completely and form a bonded ceramic body within grooves 8. The excess alundum powder is then removed form grooves 8 to create bulges 34 approximately 2 mm high (FIG. 4). Bulges 34 serve as an additional source for mechanical bonding, locking and/or constraimnent of the active layer. A similar technique is used for filling cells 33 of the passive heat-transfer zone 29 but in this case bubble alundum powder 35 from Norton Company (Worcester, Mass.) was used (FIG. 44). This powder in the form of hollow spheres has an ultra-low thermal conductivity for thermal insulating applications. Extra bubble alundum powder is removed from cells 33 with purpose of forming bulges 34, as described above. Despite using similar materials 15 and 35 and similar techniques for applying these materials, the function of each is different. The alundum powder 15 is a removable material and its removal from grooves 8 create cooling channels after infiltration is completed. The bubble allundum powder 35 is not a removable material and remains in cells 33 and provides thermal insulating inserts after infiltration is completed. Such use of materials in the present invention within a mold creates the active heat-transfer zone 28 and the passive heat-transfer zone 29.

The solid base with alundum filling is sealed and further used for applying the powder mixture of the active layer. The solid base is set in limit with plastic plates 20 (FIG. 5) to create a temporary mold 36 for application of the thermoplastic mixture of chromium carbide powder. The following explanation applies for the fabrication of the core of the mold only. However, the same sequence of preferred steps, as well as same materials and same techniques, can be used for fabrication of the mold cavity.

Figure 5:
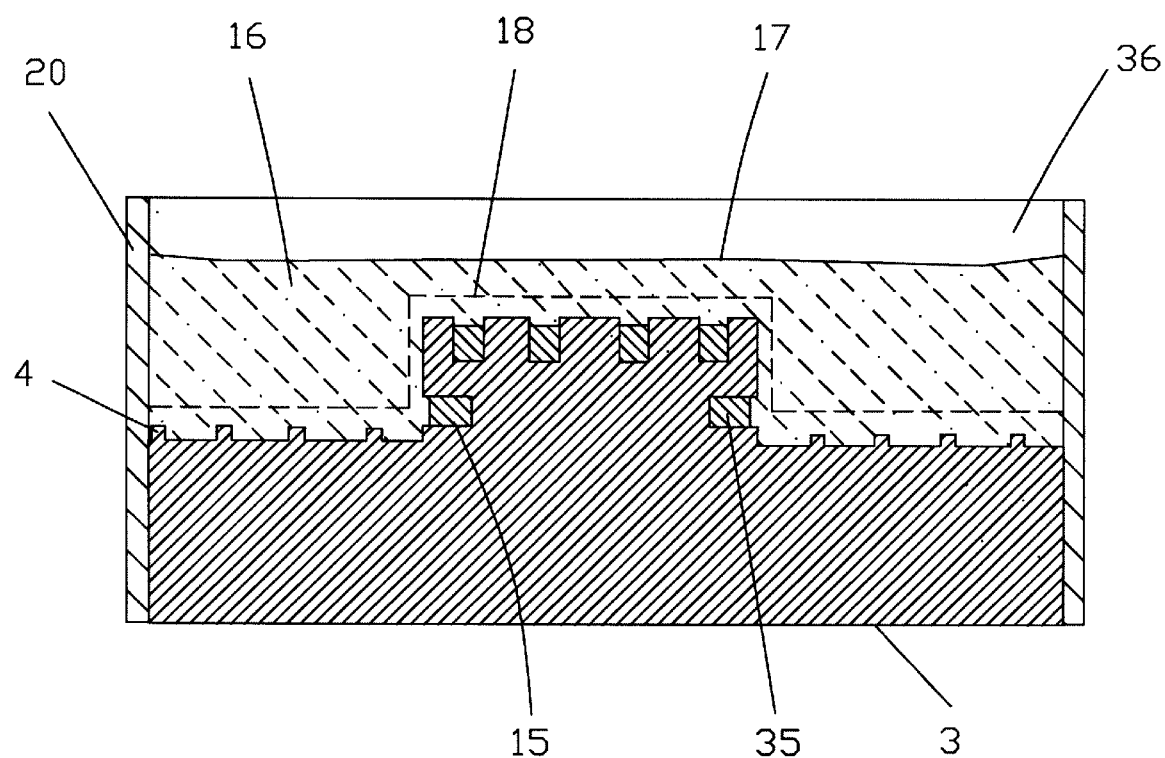
FIG. 5 is a schematic sectional view of a temporary mold for applying a thermoplastic mixture of a powder.
Figure 6:
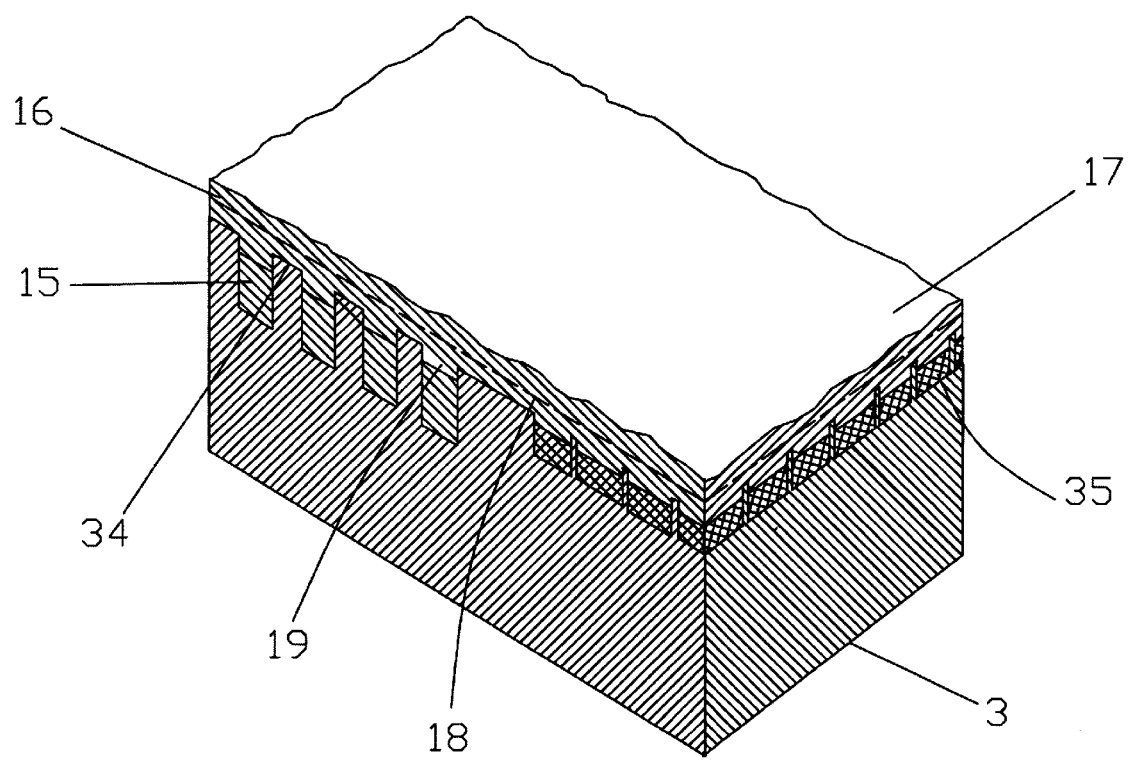
FIG. 6 is a fragmental sectional view of solid base with filled grooves and cells as well an applied thermoplastic mixture to the active layer of a mold.
Figure 7:
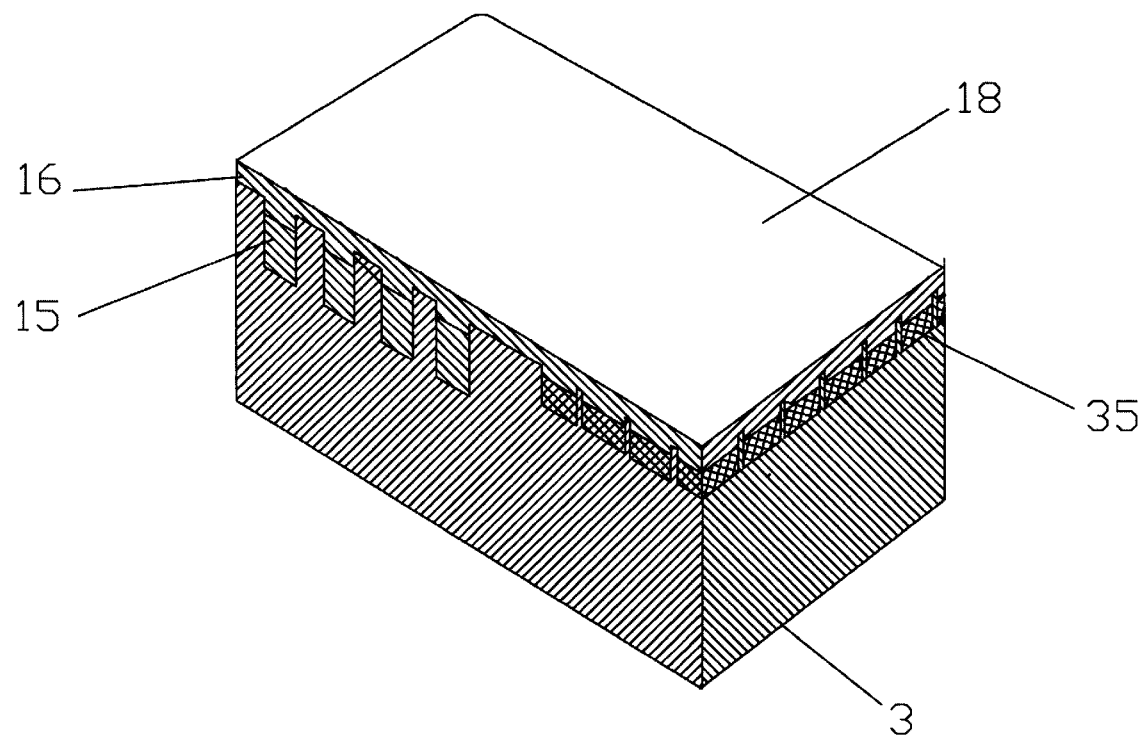
FIG. 7 is a fragmental schematic sectional view of a solid base with an applied thermoplastic mixture after its machining.

The temporary mold 36 is heated into an oven up to about 85° C. and filled with the thermoplastic mixture 16 of about 5.0 micron chromium carbide powder (SprayTech Co., Sandhook, Colo.) with paraffin (ReedWax Co., Reading, Mass.). The top filling line 17 exceeds a highest point of a contour on the active surface 18 (FIGS. 5 and 6). The thermoplastic mixture 16 also fills spaces 19 between bulges 34 (FIGS. 6 and 7). The filled mold is placed into an oven at a temperature of about 85° C. for about 3 hours for self-compacting the powder structure by segregation of paraffin to the top of thermoplastic mixture as well as by migration of the paraffin into the porous alundum body and capillary compression of chrome carbide powder structure. Such redistribution of paraffin is useful because a top layer of the thermoplastic mixture with enriched content of paraffin is removed following machining. Then the temporary mold 36 is allowed to cool at room temperature and plastic plates 20 are removed.

Figure 8:
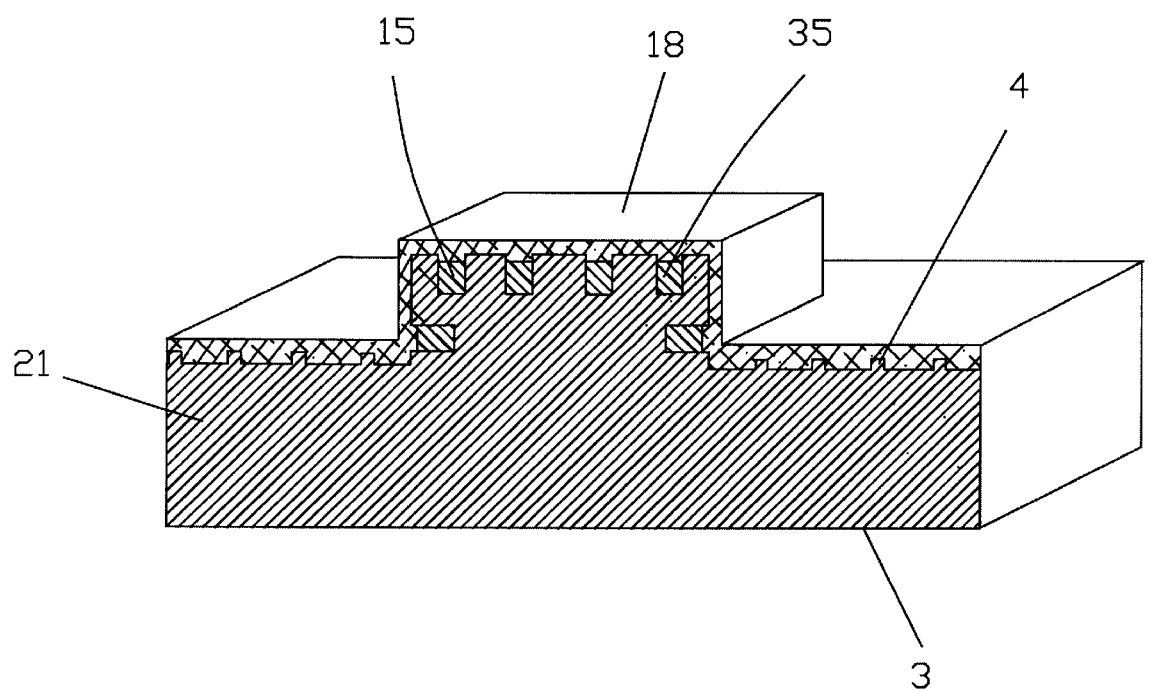
FIG. 8 is a schematic sectional view of a preform of a core before infiltration.

CNC-machining of the powder mixture 16 then creates a powdered active layer 18 with the required shape and dimensions (FIG. 8). A prior made CAD-file of the active surface of the mold with shrinkage corrections is used for this machining step. The shrinkage correction in the preferred embodiment was selected at about 0.2%. After machining the preform 21 of the tool is obtained, which includes the solid base 3, alundum-filling 15 and 35 as well the powdered active layer 18 (FIG. 8). The preform is weighed, and a weight of chromium carbide powder is specified by deduction of its prior weight. Separately, powder conductors 22 (FIG. 8) shaped as rods with about a 5 mm diameter are prepared of the same thermoplastic powder mixture that was used for making the powdered active surface of the mold.

Figure 9:
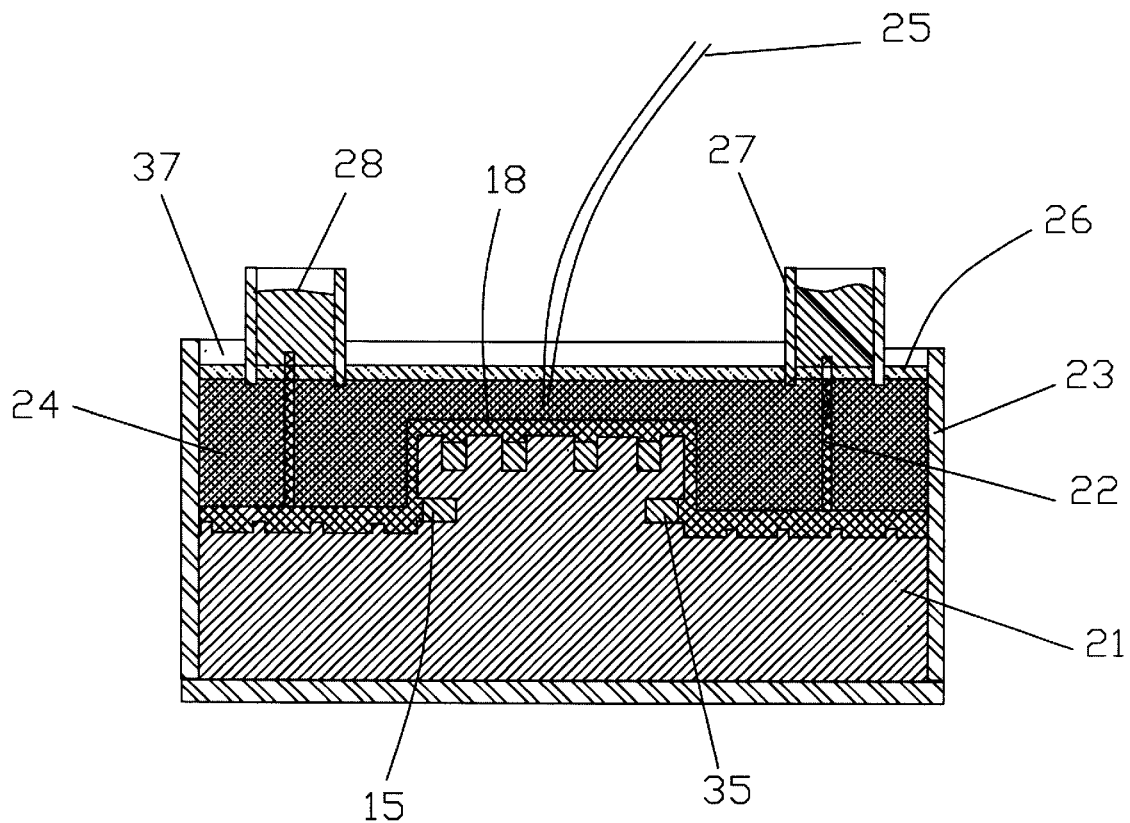
FIG. 9 is a schematic sectional view of infiltration assembling.

Preparation of an infiltration assembly 37 preferably includes pointwise soldering of powder conductors 22 to the powdered active layer 18 of mold preform (FIG. 9). Then preform 21 is enclosed with graphite plates 23 and filled with 180 microns alundum powder 24. Powder conductors are sprayed uniformly at the surface of the powdered active layer 18 with the preferred provision that one conductor feeds the powdered active layer with about 50 square centimeters. The length of the conductors is variable and depends on the configuration of the active surface. The dry alundum powder 24 is then placed above the preform 21 with the preferred result that the alundum powder layer thickens above a highest point of the powdered active surface 18 is at least about 15 mm and the powder conductors 22 exceed the top of alundum powder at about 10–15 mm. The alundum powder is compacted with vibration and a thermocouple 25 is installed into the dry alundum powder at or near to the powdered active surface 18, approximately in the geometrical center of the preform 21. Then the suspension of 5 micron alundum ceramic powder with colloidal silica (Remasol SP-30 from REMET Company, NY) is poured to create the bonded ceramic layer 26 with a thickness preferably at 5–7 mm.

Instantly, before the curing of the ceramic suspension, graphite crucibles 27 are installed into ceramic layer 26, with the provision that each crucible preferably surrounds one or more powder conductors 22, as well as all conductors 22 being preferably located within the internal space of crucibles 27. The ceramic layer 26 is allowed to cure and dry to room temperature. Then powder or granules 28 of the infiltrating alloy LR-99 from AcuPowder Co., NJ are disposed into crucibles 27. This alloy was selected in the preferred embodiment due to its relative low melt temperature of about 975° C., and reliable wetting of the chromium carbide powder and steel of the solid base. The quantity of infiltrating alloy is selected so that that it will be preferably enough for complete filling of the porous structure of the powdered active layer 18 and powder conductors 22. This condition is executed if the volume ratio of powder and infiltrating alloy formulation is about 55 to 45%. This weight ratio depends on the specific weight of components and must be calculated for each possible pair of powder and infiltrating alloy.

Following the thermal operations, debinding and infiltration is conducted. Debinding of the paraffin wax is preferably executed in a Lindberg BlueM oven providing fine temperature regulation and small temperature gradients within the chamber. The debinding process is preferably done as a stepwise heating cycle, preferably holding one hour at about 80, 170 and 350° C. The speed of temperature increase is preferably about 55° C./hour.

After debinding was complete, the preform was allowed to cool at 150 deg. C. and then placed into a vacuum furnace. The heating for infiltration was preferably executed at a vacuum of about 3.0 torr with a stepwise regime. The preform was then heated to about 950° C. with a speed of 250° C. hour, and then held for about 30 minutes to a substantially uniform temperature within the preform 21. At a second step the temperature is raised to about 1075° C. and held for about 30 minutes to complete infiltration.

Following cooling the preform was heated to about 300° C. for bonding of the infiltrating alloy. All thermal operations are regulated via an internal thermocouple 25. Infiltration of the powder active layer 18 turns it to an active metal matrix composite layer 5 of the mold. Simultaneously the infiltrating alloy metallurgically bonds the formed active layer 5 to the solid base 3, creating the macrostructured mold 1 of the present invention. This bonding also produces the locked system of cooling channels 7 between the active layer 5 and the solid base 3.

At the temperature of the 300° C. the infiltrated mold was removed from the furnace and disassembled. Conductors 22, with any remainder of infiltrating alloy, were cut off and the obtained insert of the core 2 was transferred for final machining and matching with the insert of cavity 1, which was prepared pursuant to the above described methods for the core.

It will be appreciated that the foregoing descriptions of FIGS. 1–9 highlight preferred features of the present invention. Further varieties of steps in the process and of the characteristics of the materials, which can be used in the process, are set forth below. Also, the foregoing preferred embodiment confirms that new mold designs, new composite materials and new methods of mold fabrication create a new integral interconnected design in the area of mold manufacturing, which exceeds that of the prior art.

EXAMPLE 1

The following detailed example demonstrates a method of fabrication of the present invention as applied to the preparation of a plastic injection mold, made with a laminated solid base. All concepts, methods and approaches described above were employed in this example except for the following: a laminated solid base is employed, and the laminated solid base bears the same functional duty as already described for the investment cast solid base. The purpose of using a laminated solid base is to effect a sharp reduction in time of fabrication of the solid base and reduction of the total fabrication time of the mold. The laminating approach eliminates the necessity of time-consuming operations such as building a wax model, applying a ceramic shell, melting off wax, casting, cleaning up of castings and machining a base. As a laser or water-jet cutting of steel sheets are an extremely high-production processes, the lamination approach allows one to produce solid bases for the core and cavity during one or two days, thereby reducing the total mold-fabrication time to about 12 days (see again, Table 1).

Figure 10:
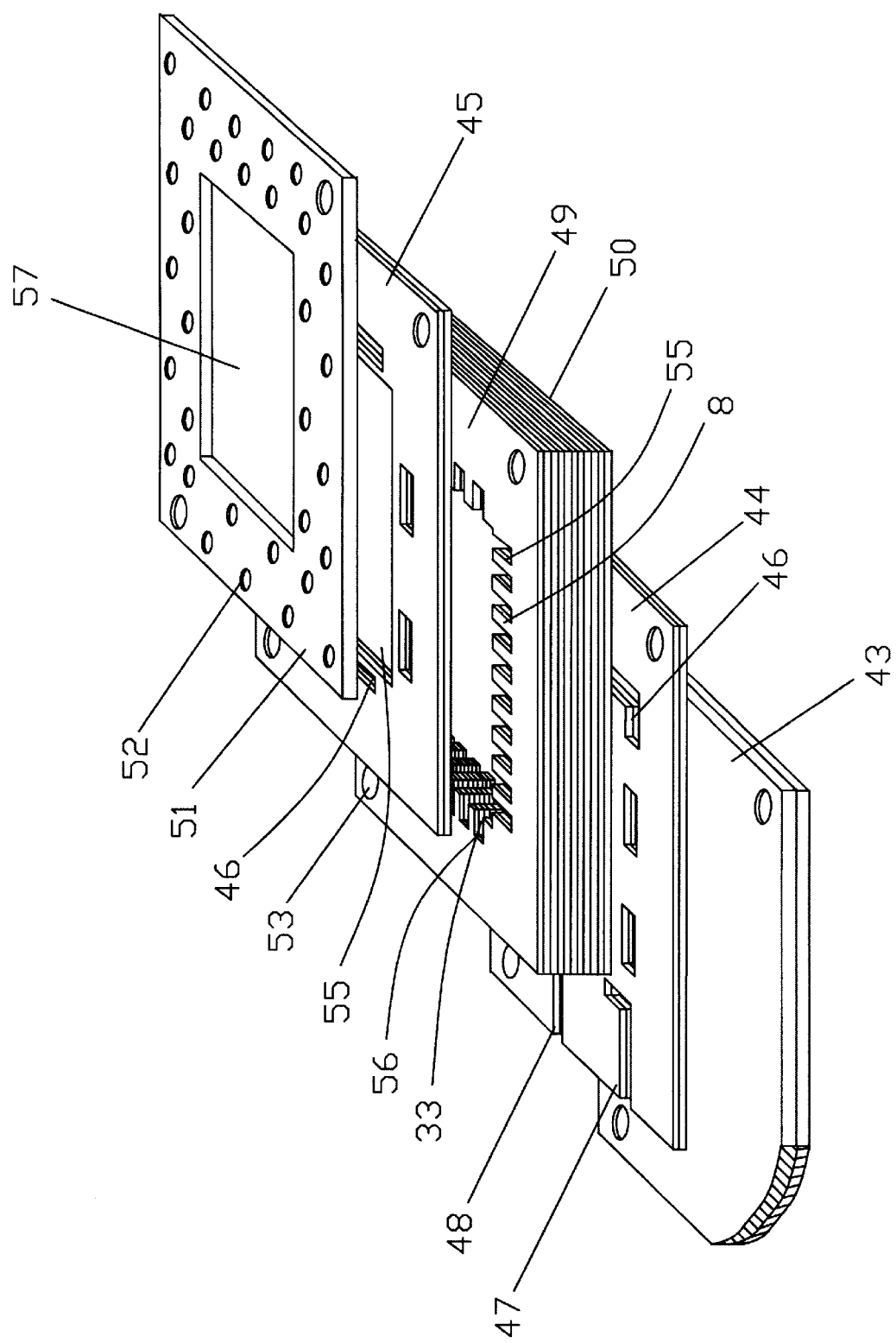
FIG. 10 is a schematic view of disassembled laminated solid base.

The design of the solid base of the core and the cavity were also engineered as described above. The disposition of active and passive heat-transfer zones as well as their preferred geometrical and numerical limitations (described earlier) were then appropriately defined. Then the design of the solid base 3 of the cavity was divided at a plurality of individually shaped laminas. The solid base design was sliced in a direction that is parallel to the parting line of the mold creating laminas with different thicknesses and different functional purposes. The ProEngineer program was used for lamination of the solid bases and creation of CAD-files for each lamina. The set of laminas for the cavity consists of solid bottom laminas (or lamina) 43, lower 44 and upper 45 laminas (or lamina) having notches 46 for shifting direction and connection of different water flow lines within the cooling system made by grooves 8. Also laminas 44 (or laminas 45) consist of notches 47 and 48 of an inlet and outlet of water. The preliminary stack 49 of shape-forming laminas 50 creates a proximal shape of the cavity. The top lamina 51 is perforated with holes 52, which are specified for mechanical bonding of the metal matrix composite layer and deceleration of shrinkage. Laminas 50, 45 and 51 were made with their own specific design of an internal cut-off 57 for forming a needed configuration of the mold. The external design and dimensions of all laminas as well as disposition of aligning holes 53 were made even to provide proper assembling laminas into the solid base and fastening by bolts 54 (FIG. 10). Laminas 50 were designed with notches 55 and 56, which in the assembled laminated solid base form cooling grooves 8 and cells 33 for disposition of thermal-insulating inserts, accordingly.

The cutting out of the steel laminas was executed with a computer guided waterjet cutting machine. The solid base of the core and cavity were cut out over 9 hours. Then, shaped laminas 43, 44, 50, 45 and 51 were stacked together in proper order using holes 52 and aligning bolts 54. In the assembled laminated solid base, notches 55 and 56 created a textured surface with grooves 8 and cells 33 (FIG. 10) similar to the those described earlier. The operation of filling with alundum powders, applying chromium carbide powder, CNC-machining, preparing infiltration assembly, burning off a thermoplastic binder and infiltration were similar to that described earlier. The infiltration turns the powdered active layer to the metal matrix composite layer and metallurgically bonds, interlocks and/or constrains the obtained active layer with the solid base. Additionally, the infiltration in the present embodiment bonds metallurgically separate laminas into a monolithic solid base. It results from capillary penetration of the molten infiltration alloy between laminas and creates metallurgical connections as previously described.

I claim:

1. A solid surface with enhanced mechanical locking interaction to an active surface layer comprising a solid base substrate with a surface thereof and an active layer disposed on said solid base surface, wherein the surface of the solid base comprises selectively defined and positioned geometrical shaped features, the active layer comprising a metal matrix composite formed by infiltration of a powder with molten infiltrating alloy.

2. The solid surface and active layer of claim 1, wherein said selectively defined and positioned geometrical shaped features on said solid base surface in contact with said active layer comprise protrusions or indentations on said solid base substrate.

3. The solid surface of claim 2 wherein said protrusions or indentations comprise a shape selected from the group consisting of cylindrical shape, a square box shape, a triangle shape, a round shape, polygonal shapes and mixtures thereof.

4. A macrostructured mold comprising:
   a solid base with a surface thereof and an active layer disposed on said surface of said solid base;
   said active layer comprising a metal matrix composite formed by the process of infiltrating a powdered preform with a molten infiltrating alloy at an infiltrating temperature, wherein said solid base is formed from material with a melt temperature higher than said infiltration temperature;
   said solid base further containing one or a plurality of geometrical shaped protrusions or indentations positioned on said solid base surface which enhance the mechanical locking interaction between said solid base surface and said active layer.

5. The macrostructured mold of claim 4 further including one or a plurality of preformed grooves between said solid base and said active layer for circulation of cooling fluid, wherein said active layer seals said grooves in said solid base wherein said sealed grooves containing said cooling fluid provide improved heat-absorbing ability to said mold.

6. The mold of claim 4 wherein said geometrical shaped protrusions or indentations comprise a shape selected from the group consisting of cylindrical shape, a square box shape, a triangle shape, a round shape, polygonal shapes and mixtures thereof.

7. The mold of claim 5 wherein said plurality of grooves are connected between one another.

8. The mold of claim 5 wherein said groove is a four sided groove defined on three sides by said solid base, said active layer defining said fourth side.

9. The mold of claim 5 wherein said groove is about 7.0 mm deep by 4.0 mm wide.

10. The mold of claim 9 wherein said plurality of grooves are positioned about 5 mm from one another.

11. The mold of claim 4 wherein said surface base surface comprises one or a plurality of protrusions of about 1.5–3.0 mm high and about 3.0–12.0 mm in width.

12. The mold of claim 4 wherein said plurality of geometrical indentations or protrusions are spaced apart about 5.0 to 25.0 mm.

13. The mold according to claim 5 wherein said one or plurality of preformed grooves are located in said mold to cool said mold.

14. The mold according to claim 5 containing an inlet and outlet for circulating cooling fluid in said one or plurality of grooves.

15. The mold according to claim 5, wherein said metal matrix composite is made by infiltration of a powdered active layer selected from the group consisting of chromium carbide, tungsten carbide, titanium carbide, stainless steel, carbon steel, alloyed steel, nickel based alloys, cobalt based alloys or mixtures thereof.

16. The macrostructured mold according to claim 5, wherein said infiltrating alloy is selected from the group consisting of copper based alloys, nickel based alloys, iron based alloys, silver based alloys, cobalt based alloys or mixtures thereof.

17. The macrostructured mold according to claim 5, wherein the thickness of said metal matrix composite active layer is about 0.5–100 mm.

18. A macrostructured mold with improved heat-absorbing ability comprising:
   a solid base and an active layer disposed on said solid base;
   said active layer comprising a metal matrix composite formed by the process of infiltrating a powdered preform with a molten infiltrating alloy at an infiltrating temperature, wherein said solid base is formed from material with a melt temperature higher than said infiltration temperature;
   said solid base further containing one or a plurality of preformed grooves for circulation of cooling fluid, wherein said active layer seals said grooves in said solid base wherein said sealed grooves containing said cooling fluid provide said improved heat-absorbing ability;
   said solid base also containing cells wherein said active layer additionally seals said cells in said solid base, said cells containing a thermal insulating insert material.

19. The mold of claim 18 wherein said mold contains an inlet section for injection of molding material, and said cells are positioned at or near said inlet section to reduce heat transfer in said inlet section from said molding material to said mold.

20. The mold of claim 18 wherein said mold contains a section for the molding of a wall or rib section of a molded part, wherein said cells are positioned at or near said wall or rib section.

21. The mold of claim 18 wherein said cells are four sided cells defined on three sides by said solid base, said active layer defining said fourth side.

22. The mold of claim 18 wherein said thermal insulating material comprises aluminum oxide, titanium oxide, inorganic oxides, ceramics, asbestos, and mixtures thereof.

* * * * *

UNITED STATES PATENT AND TRADEMARK OFFICE
CERTIFICATE OF CORRECTION

PATENT NO. : 6,209,847 B1
DATED : April 3, 2001
INVENTOR(S) : Viktor Frul

It is certified that error appears in the above-identified patent and that said Letters Patent is hereby corrected as shown below:

<u>Column 20,</u>
Line 8, remove "surface" after -- said --

Signed and Sealed this

Seventh Day of May, 2002

*Attest:*

JAMES E. ROGAN
*Director of the United States Patent and Trademark Office*

*Attesting Officer*